US012455538B2

(12) United States Patent
Ozawa

(10) Patent No.: US 12,455,538 B2
(45) Date of Patent: Oct. 28, 2025

(54) WRIST WATCH AND STRAP

(71) Applicant: SEIKO EPSON CORPORATION, Tokyo (JP)

(72) Inventor: Yuichi Ozawa, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 333 days.

(21) Appl. No.: 17/898,831

(22) Filed: Aug. 30, 2022

(65) Prior Publication Data

US 2023/0064602 A1 Mar. 2, 2023

(30) Foreign Application Priority Data

Aug. 31, 2021 (JP) ................................ 2021-140982

(51) Int. Cl.

*G04B 45/00* (2006.01)
*A44C 5/00* (2006.01)
*G04B 37/00* (2006.01)
*G04B 45/02* (2006.01)

(52) U.S. Cl.

CPC ............ *G04B 45/0092* (2013.01); *A44C 5/00* (2013.01); *G04B 37/0008* (2013.01); *G04B 45/02* (2013.01)

(58) Field of Classification Search

CPC G04B 45/0084; G04B 45/0092; G04B 47/04; A44C 5/12
See application file for complete search history.

(56) References Cited

U.S. PATENT DOCUMENTS

| | | | | |
|---|---|---|---|---|
| 11,337,495 | B2 * | 5/2022 | Buck | A44C 9/0053 |
| 2017/0168460 | A1 * | 6/2017 | Willemin | G04C 10/02 |
| 2020/0292991 | A1 | 9/2020 | Miyashita | |

FOREIGN PATENT DOCUMENTS

| | | | | |
|---|---|---|---|---|
| CH | 708002 | A2 * | 10/2014 | G04B 19/18 |
| CN | 108958003 | A * | 12/2018 | G04B 19/065 |
| JP | 2018-117903 | A | 8/2018 | |
| JP | 2020-148651 | A | 9/2020 | |
| WO | 2018-139149 | A1 | 8/2018 | |

OTHER PUBLICATIONS

Translation of CN108958003, Espacenet (Year: 2018).*
Corum Watches, Golden Bridge Watch, Swiss Luxury (Year: 2020).*
Translation of CH708002, Espacenet (Year: 2014).*

* cited by examiner

*Primary Examiner* — Renee S Luebke
*Assistant Examiner* — Matthew Daniel Hwang
(74) *Attorney, Agent, or Firm* — Harness, Dickey & Pierce, P.L.C.

(57) ABSTRACT

A watch body and a strap are included. The watch body includes a case body having a cylindrical shape, a movement disposed inside the case body, a cover member covering one opening of the case body, and a case back covering the other opening of the case body and including a transmissive region through which the movement can be visually recognized from the outside and the movement can be visually recognized through the cover member. The strap is attached to the watch body and includes a base facing the case back of the watch body and a strap body coupled to the base. The base includes a decoration at a position overlapping at least a part of the transmissive region, and the decoration can be visually recognized through the cover member.

8 Claims, 11 Drawing Sheets

WRIST WATCH AND STRAP

The present application is based on, and claims priority from JP Application Serial Number 2021-140982, filed Aug. 31, 2021, the disclosure of which is hereby incorporated by reference herein in its entirety.

BACKGROUND

1. Technical Field

The present disclosure relates to a wrist watch and a strap.

2. Related Art

JP 2018-117903 A discloses a portable device arm mounting tool including a supporting member having a plate shape and supporting the portable device and a cover member (corresponding to a strap) attached to the supporting member.

JP 2020-148651 A discloses a watch having a see-through structure in which a mechanism inside a watch can be visually recognized from a viewpoint of further exhibiting decorativeness.

SUMMARY

However, when the watch of JP 2020-148651 A is attached to the arm mounting tool of JP 2018-117903 A, a part of the supporting member may be visually recognized from the cover glass side. Thus, there is a problem that the decorativeness of the watch is lowered.

SUMMARY

A wrist watch includes a watch body including a case body having a cylindrical shape, a movement disposed inside the case body, a cover member covering one opening of the case body and including a transmissive region, and a case back covering the other opening of the case body and including a transmissive region, and a strap attached to the watch body and including a base facing the case back of the watch body and a strap body coupled to the base, wherein the base includes a decoration at a position overlapping the transmissive region of the case back, and the decoration can be visually recognized through the transmissive region of the cover member.

The strap includes the base facing the case back of the watch body and the strap body coupled to the base, and the base includes the decoration on a surface facing the case back.

DESCRIPTION OF EXEMPLARY EMBODIMENTS

A configuration of a wrist watch 100 of a first embodiment will be described with reference to FIGS. 1 to 4.

Note that, for the sake of convenience of description, an X axis, a Y axis, and a Z axis are illustrated in each of the drawings as three axes perpendicular to each other. A direction parallel to the X axis, a direction parallel to the Y axis, and a direction parallel to the Z axis are also referred to as an "X axis direction", a "Y axis direction", and a "Z axis direction", respectively. The Z axis direction is along the vertical direction, and the XY plane is along the horizontal plane. A tip side and a base end side of an arrow in each axis direction are also referred to as a "positive side" and a "negative side", respectively. The positive side in the Z axis direction and the negative side in the Z axis direction are also referred to as "up" or "upward" and "down" or "downward", respectively. Viewing from a +Z direction is referred to as plan view or planar. A surface on the + side in the Z direction will be described as an upper surface, and a surface on the − side in the Z direction opposite to the upper surface will be described as a lower surface.

Figure 1:
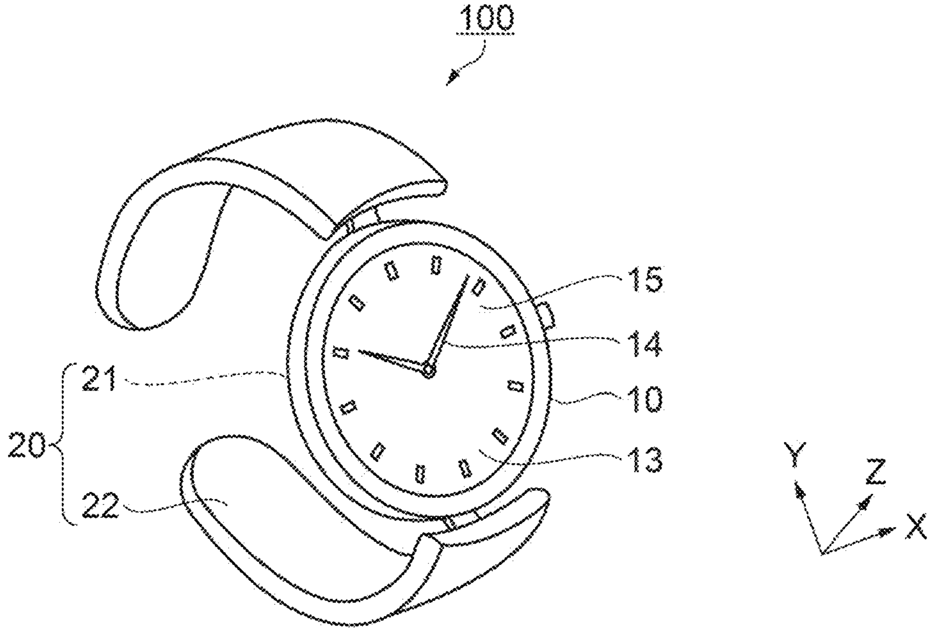
FIG. 1 is a perspective view illustrating a configuration of a wrist watch according to a first embodiment.
Figure 2:
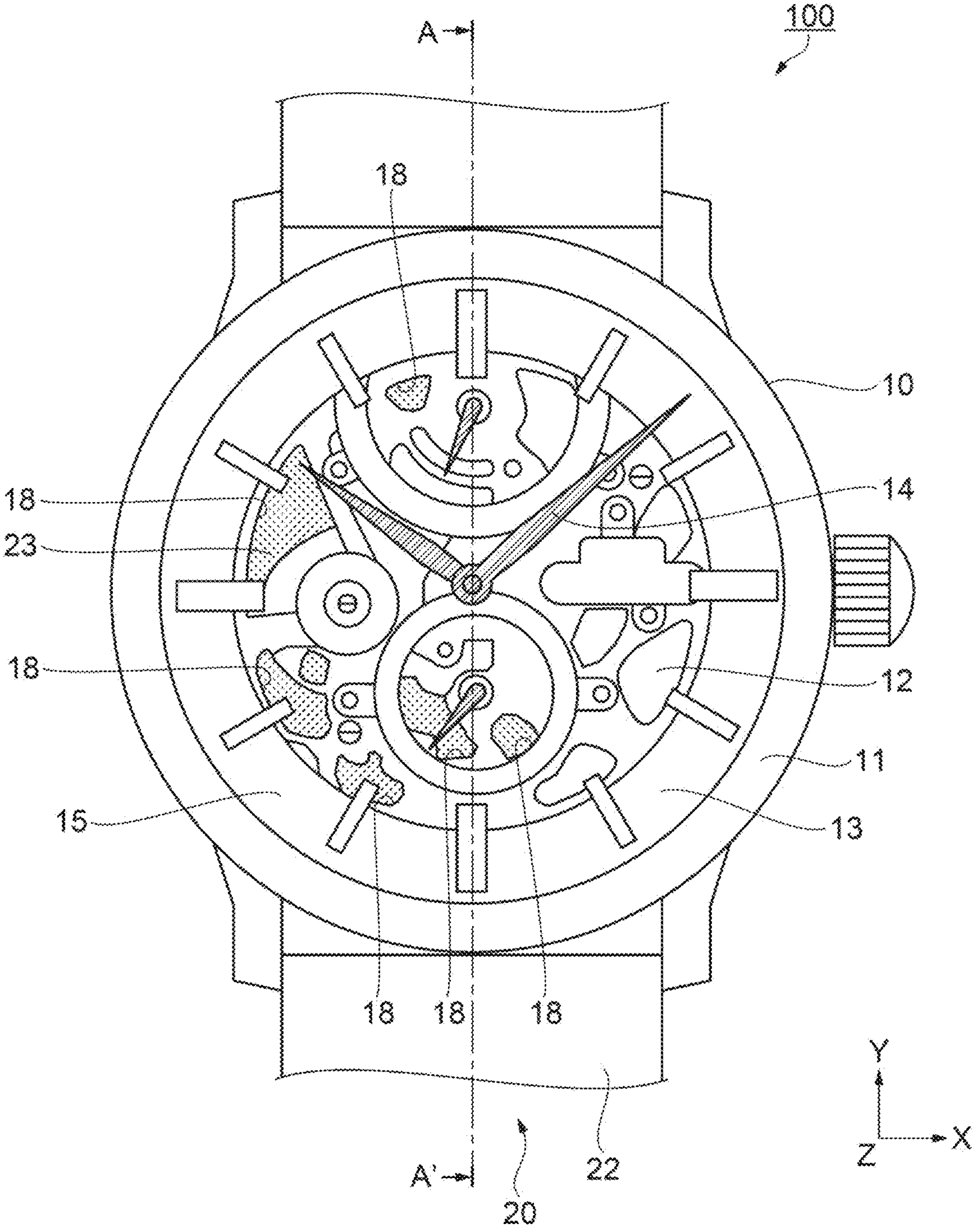
FIG. 2 is a plan view illustrating a configuration of a wrist watch.

As illustrated in FIG. 1, the wrist watch 100 includes a watch body 10 for displaying time and the like and a strap 20 including a base 21 (see FIGS. 3 and 4) for supporting the watch body 10 and a strap body 22 coupled to the base 21.

Figure 5:
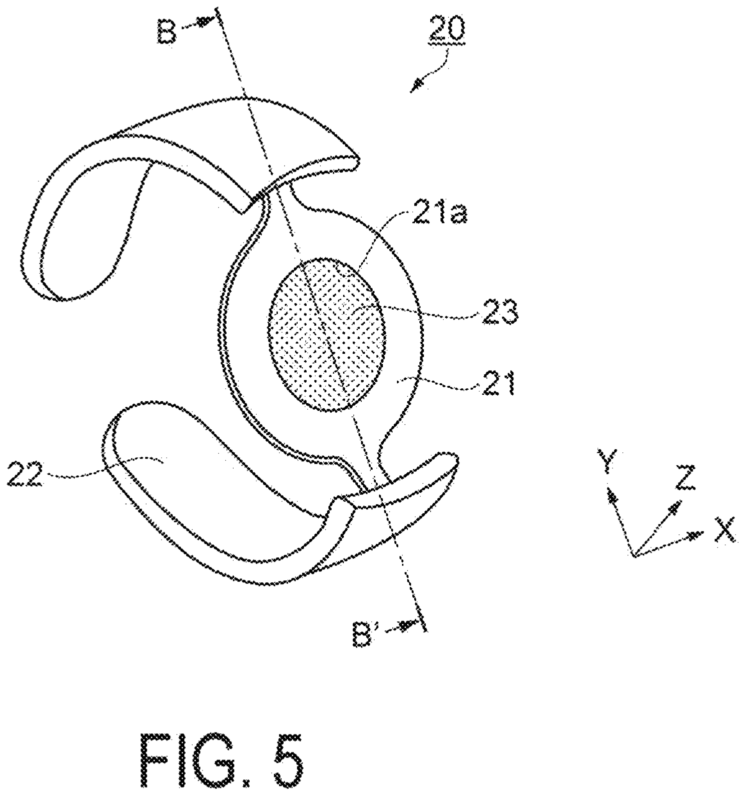
FIG. 5 is a perspective view illustrating a configuration of a strap.

In the wrist watch 100 illustrated in FIG. 1, the watch body 10 is easily attached to and detached from the strap 20 (see FIG. 5). Thus, the watch body 10 can be replaced with another watch body and attached while the strap 20 is left as it is. Furthermore, the strap 20 can be replaced with another strap and attached while the watch body 10 is left as it is. Note that a specific description of a detachment mechanism is omitted.

Figure 4:
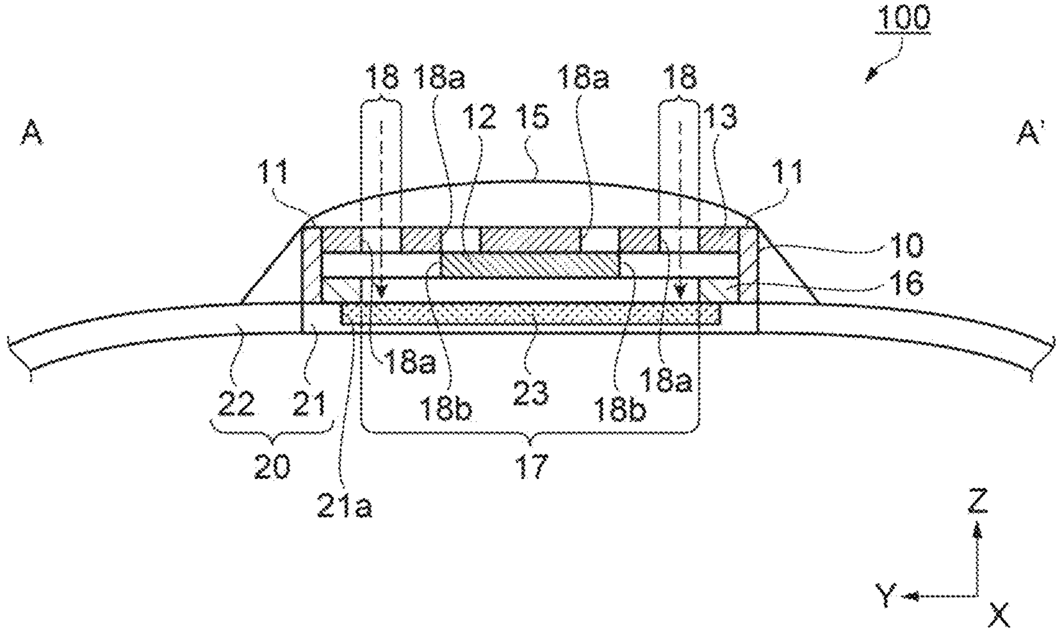
FIG. 4 is a cross-sectional view taken along line A-A' of the wrist watch illustrated in FIG. 2.

The watch body 10 includes a case body 11 having a cylindrical shape (see FIG. 4). A movement 12 (see FIG. 2) and a dial 13 are disposed inside the case body 11. The dial 13 is formed of resin or metal, and a hand 14 including a second hand, a minute hand, an hour hand, or the like is disposed on the upper side of the dial 13. The dial 13 includes an opening described below. The hand 14 is driven by the movement 12.

The movement 12 includes a step motor and a ring train (not illustrated) for driving the hand 14, and a control circuit board (not illustrated) for controlling the driving of the step motor. The movement 12 includes an opening described below. The movement 12 may be a mechanical movement including a mainspring as a power source, or may be a quarts movement including a battery as the power source.

Figure 3:
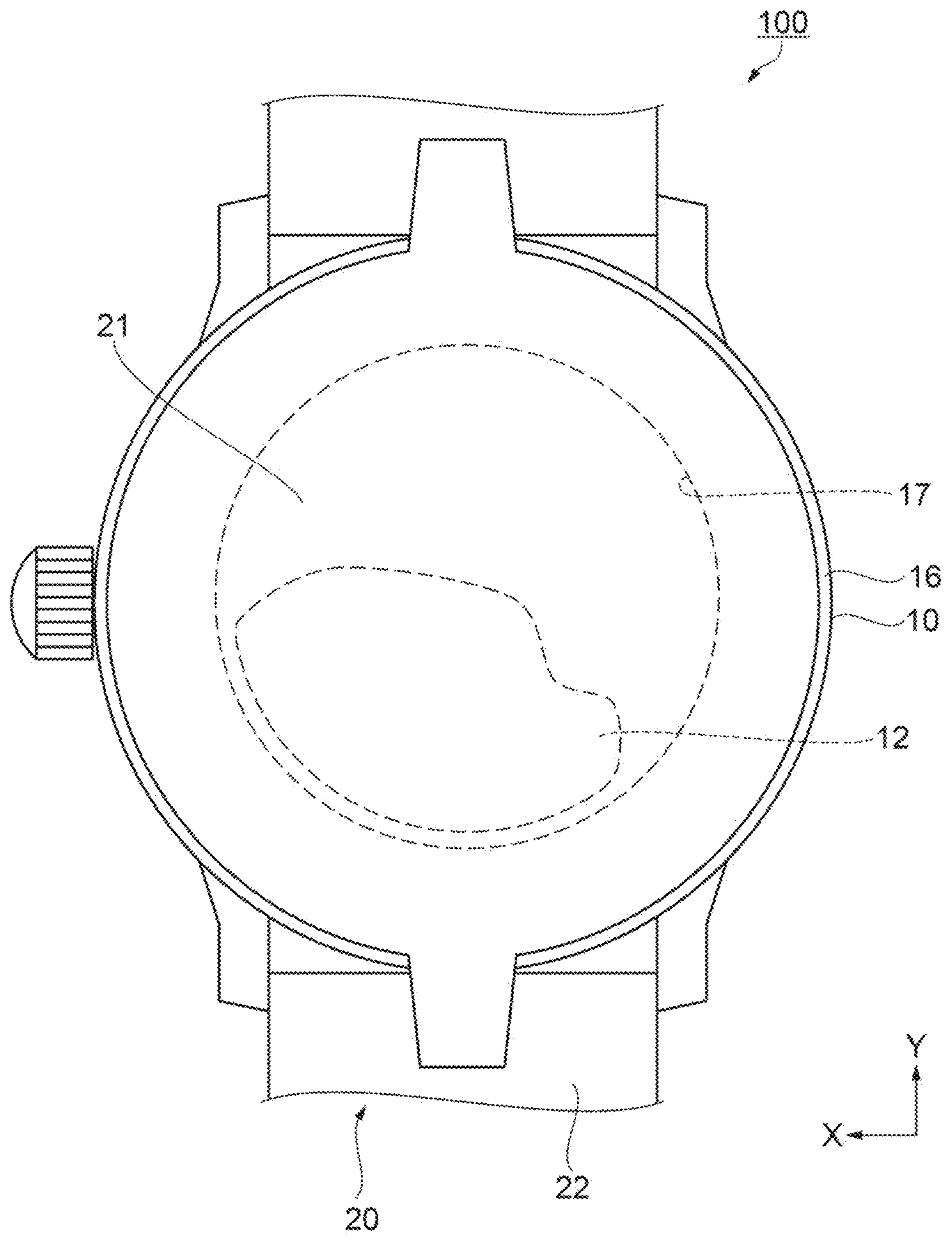
FIG. 3 is a plan view illustrating a configuration of a wrist watch.

As illustrated in FIG. 4, a cover member 15 covering one opening and a case back 16 covering the other opening are provided in the case body 11. The cover member 15 is formed of a transparent member such as glass. As illustrated in FIGS. 3 and 4, the case back 16 includes an outer peripheral portion formed of metal and fixed to the case body 11 and a transmissive region 17 disposed inside the outer peripheral portion, the movement 12 being visually recognized from the outside through the transmissive region 17. The transmissive region 17 of the case back 16 is formed of, for example, a transparent member such as glass or the like. Note that not limited to only the transmissive region 17, the entirety of the case back 16 may be made of glass.

In the watch body 10, the dial 13, the hand 14, and the movement 12 can be visually recognized through the cover member 15. In the present embodiment, the entirety of the cover member 15 is a transmissive region, but a part may be a non-transmissive region by printing or the like, and at least a part may be the transmissive region. Note that a surface in which the dial 13 and the hand 14 are visually recognized is referred to as a display surface.

As illustrated in FIG. 4, the strap 20 is attached to the watch body 10. The strap 20 is provided with the base 21 facing the case back 16 of the watch body 10. The strap body 22 is coupled to the base 21.

Next, a configuration of the strap 20 will be described with reference to FIGS. 5 to 7.

Figure 6:
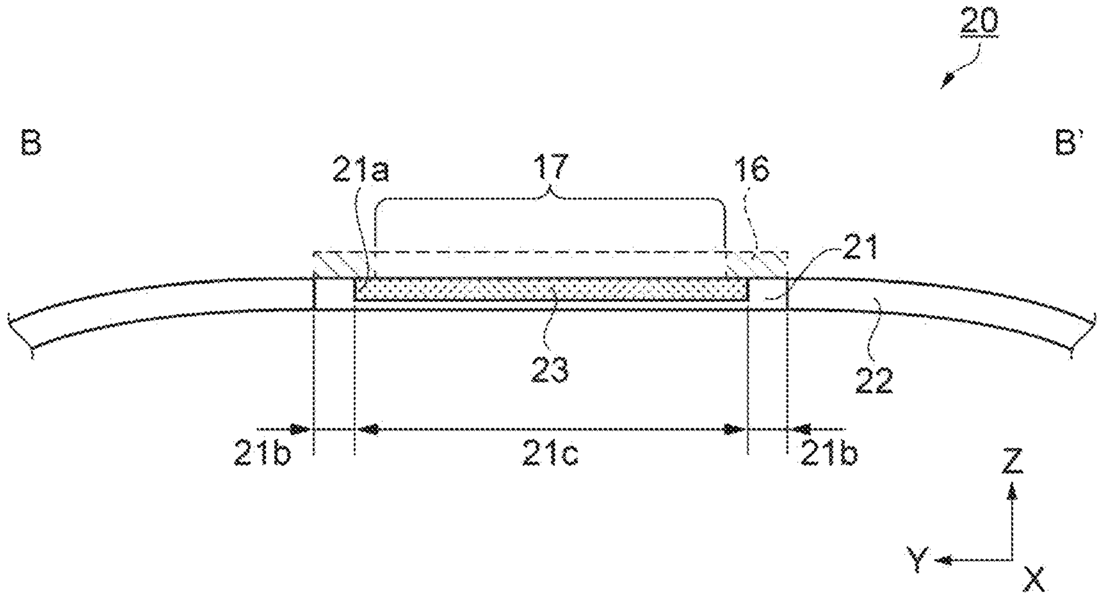
FIG. 6 is a cross-sectional view taken along line B-B' of the strap illustrated in FIG. 5.
Figure 7:
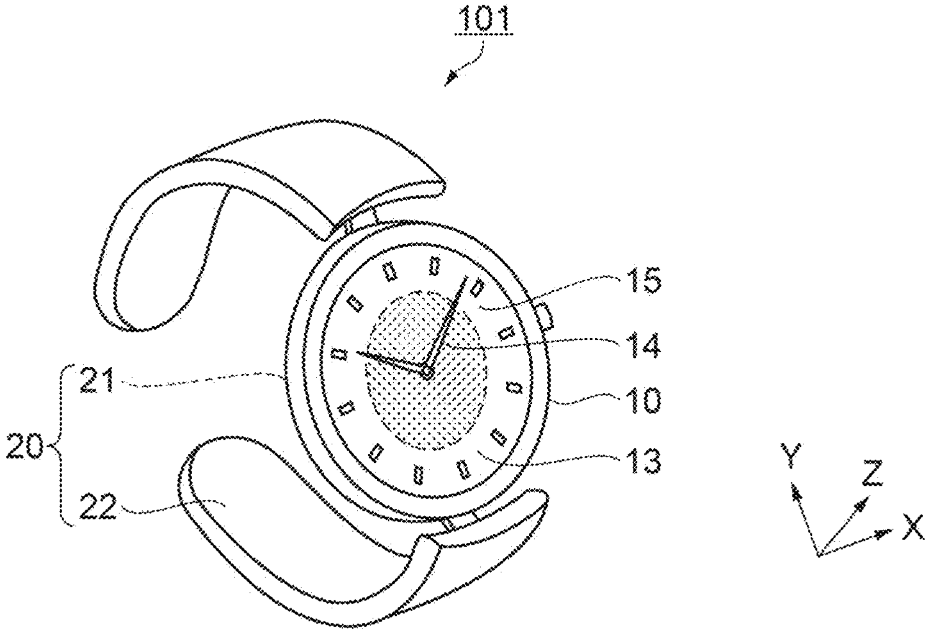
FIG. 7 is a perspective view illustrating a configuration of a wrist watch according to a second embodiment.

As illustrated in FIGS. 5 and 6, the strap 20 includes the base 21 disposed to face the case back 16 of the watch body 10, and the strap body 22 coupled to the base 21, as described above. When the base 21 is disposed to face the case back 15, the base 21 substantially overlaps the case back 15 in plan view. When the watch body 10 is attached to the strap body 22, an upper surface of the base 21 in other words a surface on the case back side of the base is in contact with the case back 16.

As illustrated in FIG. 5, the base 21 is formed in a shape similar to the watch body 10. Note that the base 21 is not limited to a circular shape, and may be a rectangular shape. The circular shape or the rectangular shape may be selected in accordance with the shape of the watch body 10. The outer dimension of the base 21 may be smaller than the watch body 10 from the perspective of the decorativeness.

A decoration 23 is provided in the central portion on the case back side of the base 21. Specifically, a recessed portion 21*a* for disposing the decoration 23 is provided in the central portion of the base 21. Note that a region in the base 21 where the decoration 23 is not provided is referred to as a first region 21*b*. A region the base 21 in the base 21 where the decoration 23 is provided is referred to as a second region 21*c*. When the watch body is attached to the strap 20, the upper surface, which is the surface on the case back side of the first region 21*b*, is in contact with the case back 16, and the recessed portion 21*a* of the second region 21*c* has a shape recessed on the opposite side to the case back 16 with respect to the upper surface of the first region 21*b*.

As illustrated in FIG. 6, the decoration 23 is disposed at a position overlapping the transmissive region 17 of the case back 16. The decoration 23 may overlap at least a part of the transmissive region 17 of the case back 16. Furthermore, the decoration 23 may be disposed in accordance with the shape of the transmissive region 17. For example, when the shape of the transmissive region 17 is the circular shape, the decoration 23 is also disposed in the circular shape, such that the entirety of the transmissive region 17 substantially overlaps the entirety of the decoration 23 in plan view. Accordingly, the decoration 23 can be prevented from being applied more than necessary, and the decoration 23 can be visually recognized efficiently. The range of the decoration 23 may be wider than the transmissive region 17 of the case back 16 so as to be aligned with each other with a margin. Note that the decoration 23 may be in contact with or spaced apart from the case back 16.

The total thickness of the base 21 is, for example, 0.7 mm. The depth of the recessed portion 21*a* is, for example, from 0.4 mm to 0.5 mm.

The base 21 is formed of a metal material such as brass (BS), stainless steel (SUS), titanium alloys, or the like. Note that the base 21 may be formed of a resin material. A two-body configuration may be used in which the outer periphery of the base 21 is a metal material, and the inner side may be a resin material or the like, and the inner side may be configured to be detachably attachable.

Examples of s material other than the metal of the base 21 include vinyl chloride, ABS, acryl, polycarbonate, MC nylon, polyethylene, polyacetal, PET, paper phenol, cloth phenol, EVA, casting nylon, polystyrene, polyurethane, rubber, and glass.

The decoration 23 is, for example, a light emitting body as a light emitting unit such as a fluorescent paint. The light emitting body may be, for example, a luminous paint for glowing in the dark and a luminous paint for accumulating light. Examples of the luminous paint include a modified vinyl resin paint and an acrylic emulsion paint. Examples of the luminous paint for glowing in the dark include tritium. Examples of the luminous paint for accumulating light include an acrylic resin, a vinyl resin, a urethane resin, and an acrylic emulsion resin.

The strap body 22 is formed of, for example, a hard resin material, and is curved so as to wrap around the arm. Note that the strap body 22 may be formed of a metal material.

In the wrist watch 100, as illustrated in FIG. 4, the decoration 23 of the base 21 can be visually recognized through the cover member 15 in regions where opening portions 18*a* in the dial 13 and opening portions 18*b* in the movement 12 overlap with each other. The regions where the opening portions 18*a* and the opening portions 18*b* overlap with each other are referred to as visual recognition regions 18. The opening portions 18*b* in the movement 12 are formed by providing openings by lightening a main plate and a receiving member constituting the movement 12. Note that the opening portions 18*a* and the opening portions 18*b* may perpendicularly overlap with the case back 16, but may obliquely overlap with the case back 16. That is, the decoration 23 of the base 21 being able to be visually recognized through the transmissive region of the cover member 15 includes the decoration 23 being able to be directly visually recognized as well as the decoration 23 being able to be indirectly visually recognized, and the visual recognition regions 18 may be formed so that the decoration 23 of the base 21 can be directly or indirectly visually recognized.

By using such a wrist watch 100, it is possible to increase the decorativeness even when the base 21 entirely covers a see-through function of a rear surface of the watch body 10. For example, in the dark, the light emitted from the decoration 23 of the base 21 leaks from gaps, that is, the visual recognition regions 18, of the internal structure of the watch to be directly or indirectly visually recognized and the light effect can be performed.

As described above, the wrist watch 100 includes the watch body 10 including the case body 11 having a cylindrical shape, the movement 12 disposed inside the case body 11, the cover member 15 covering one opening of the case body 11 and including the transmissive region, and the case back 16 covering the other opening of the case body 11 and including the transmissive region 17, and the strap 20 attached to the watch body 10 and including the base 21 facing the case back 16 of the watch body 10, and the strap body 22 coupled to the base 21, wherein the base 21 includes the decoration 23 at the position overlapping the transmissive region 17 of the case back 16, and the decoration 23 can be visually recognized through the transmissive region of the cover member 15.

According to this configuration, the movement 12 can be visually recognized from the cover member 15 side, and the decoration 23 is provided on the base 21, and thus the decoration 23 of the base 21 can be viewed from the cover member 15 side, and the decorativeness of the wrist watch 100 can be enhanced.

In the wrist watch 100 of the first embodiment, the decoration 23 may include the light emitting body as the light emitting unit. According to this configuration, since the light emitting unit is included, the light emitting unit can be viewed from the cover member 15 side, and thus the decorativeness of the wrist watch 100 can be enhanced.

In the wrist watch 100 of the first embodiment, the base 21 includes the first region 21*b* including the surface in contact with the case back 16, and the second region 21*c* recessed on the opposite side to the case back 16 with respect to the surface of the first region 21*b*, and the decoration 23 may be provided in the second region 21*c*. According to this configuration, the decoration 23 is provided in the recessed portion 21*a*, which is the second region, and thus the adhesion between the decoration 23 and the case back 16 can be increased, and the visibility from the cover member 15 side can be improved.

In the wrist watch 100 of the first embodiment, the decoration 23 may be disposed in accordance with the shape of the transmissive region 17. According to this configuration, the decoration 23 can be prevented from being applied to the base 21 more than necessary, and the decoration 23 can be visually recognized efficiently.

The strap 20 of the first embodiment includes the base 21 facing the case back 16 of the watch body 10 and the strap body 22 coupled to the base 21, and the base 21 includes the decoration 23 on a surface facing the case back 16.

According to this configuration, when the strap 20 is attached to the watch body 10, the decoration 23 of the base 21 can be visually recognized from the cover member 15 side, and thus the decorativeness of the strap 20 and the wrist watch 100 can be enhanced.

Next, with reference to FIGS. 7 to 13, a wrist watch 101 and a strap 120 of a second embodiment will be described.

As illustrated in FIGS. 7 to 13, the wrist watch 101 of the second embodiment differs from the wrist watch 100 of the first embodiment in that a decoration 123 of the base 21 configuring the strap 120 has a mesh shape. Other configurations are substantially the same. Thus, in the second embodiment, portions different from those of the first embodiment will be described in detail, and descriptions of other overlapping portions will be omitted as appropriate.

Figure 8:
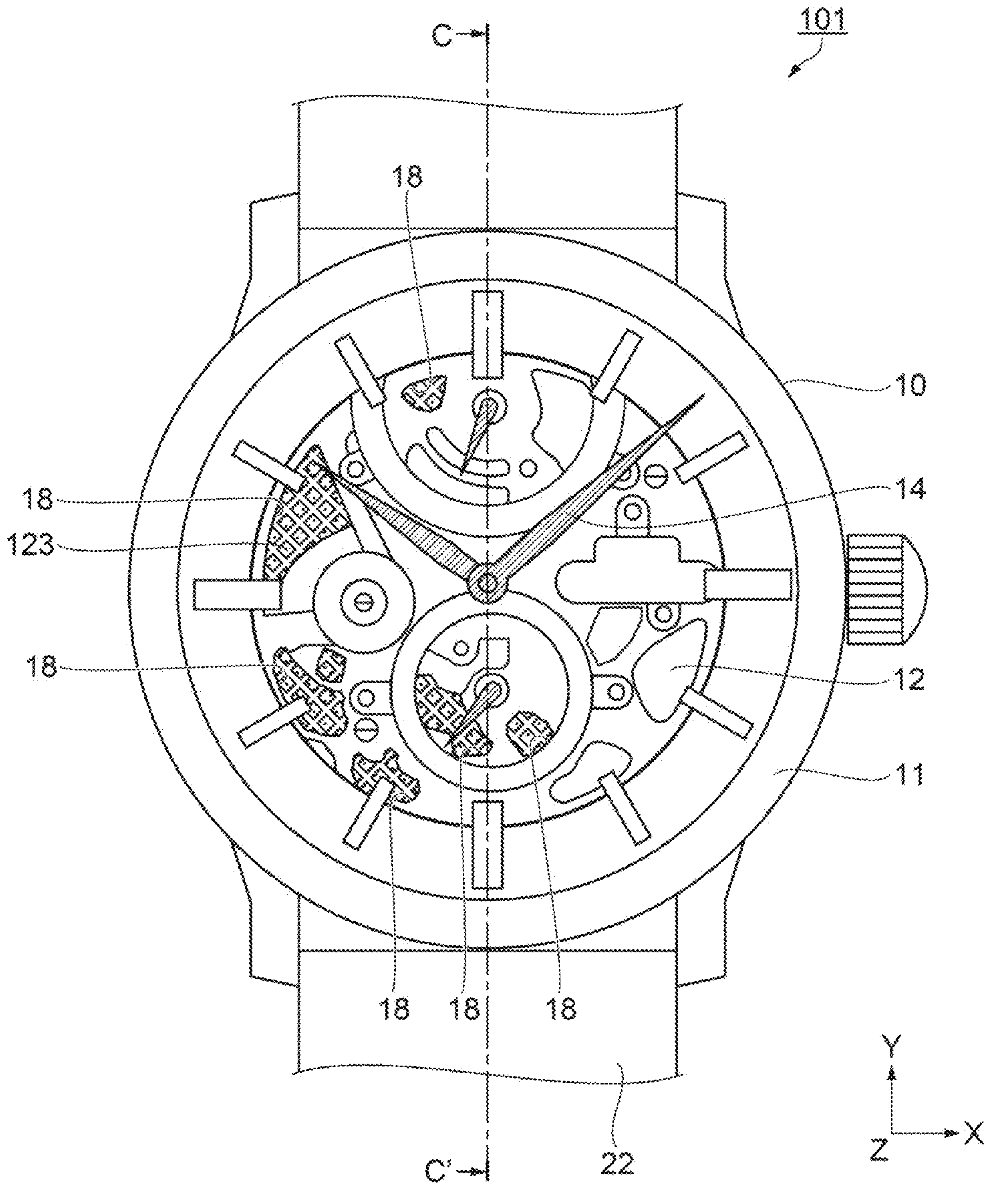
FIG. 8 is a plan view illustrating a configuration of a wrist watch.

As illustrated in FIG. 8, in the wrist watch 101 of the second embodiment, the decoration 123 emitting in a mesh shape as a pattern shape can be visually recognized in the visual recognition regions 18 of the watch body 10.

Figure 9:
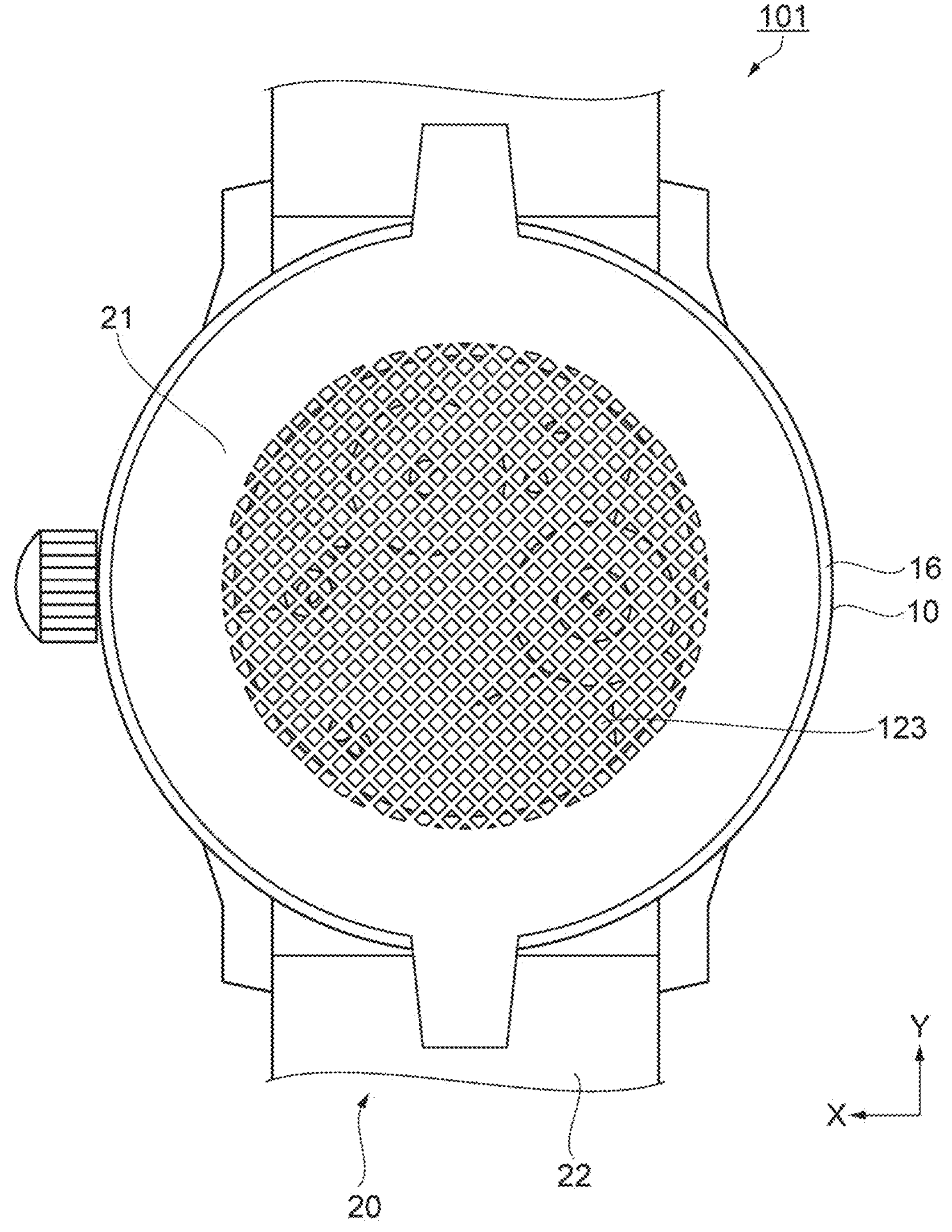
FIG. 9 is a plan view illustrating a configuration of a wrist watch.

As illustrated in FIG. 9, components of the movement 12 can be visually recognized from the rear surface of the wrist watch 101 through the decoration 123 having the mesh shape provided in the base 21 and the transmissive region 17 of the case back 16.

Figure 10:
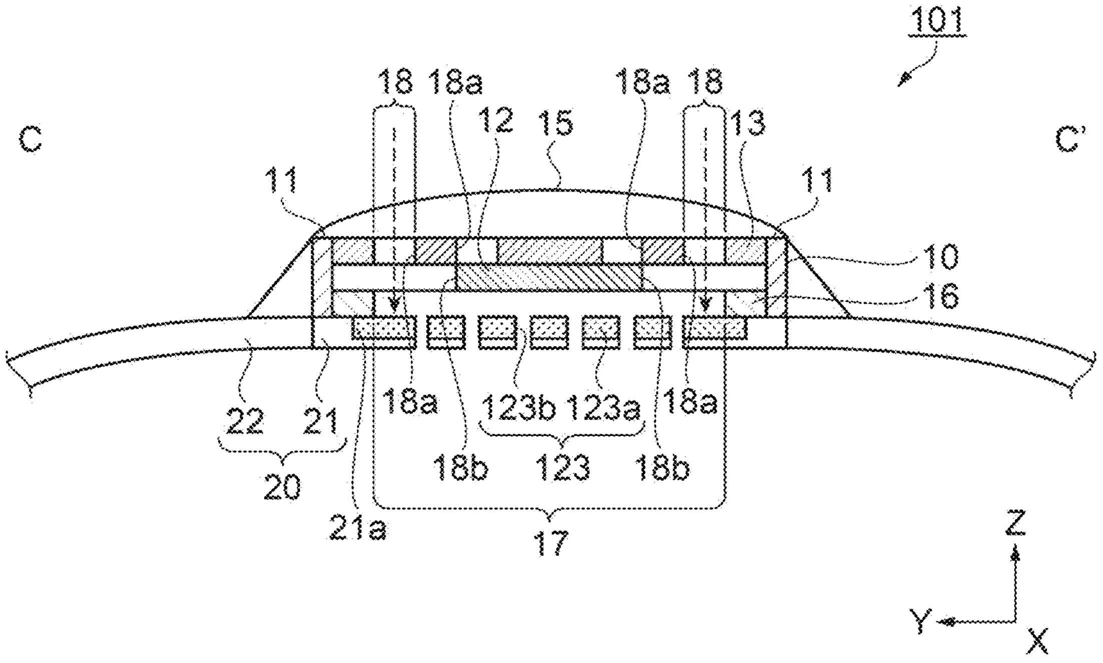
FIG. 10 is a cross-sectional view taken along line C-C' of the wrist watch illustrated in FIG. 8.

As illustrated in FIG. 10, in the wrist watch 101, the decoration 123 having the mesh shape can be visually recognized in the visual recognition regions 18 where the opening portions 18*a* of the dial 13 and the opening portions 18*b* of the movement 12 overlap with each other.

Figure 11:
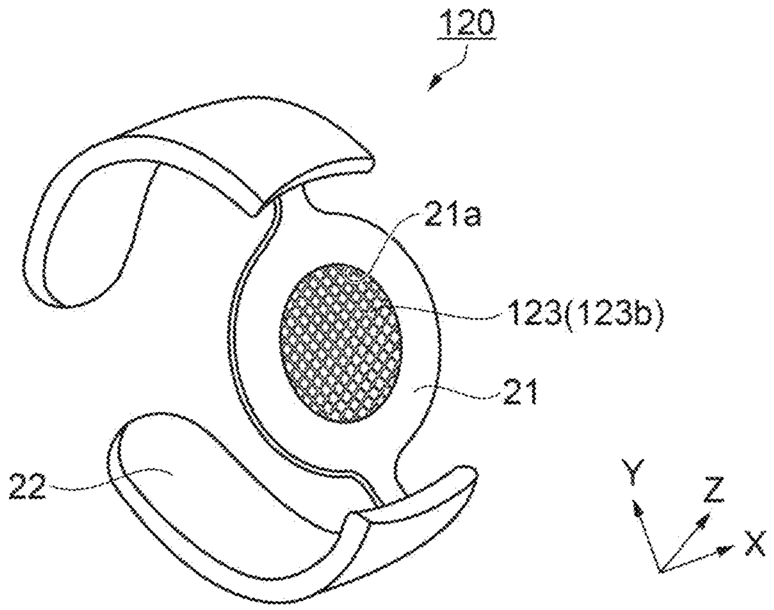
FIG. 11 is a perspective view illustrating a configuration of a strap.
Figure 12:
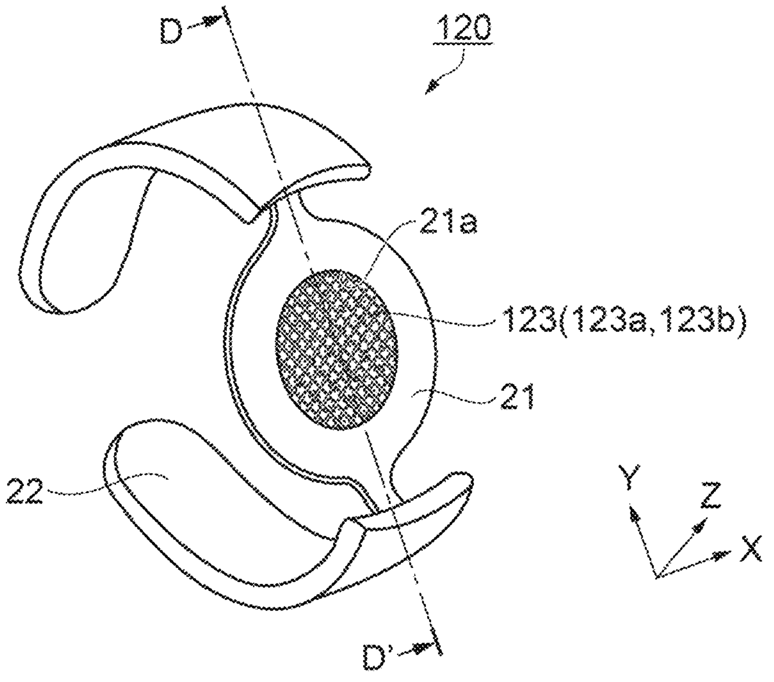
FIG. 12 is a perspective view illustrating a configuration of a strap.
Figure 13:
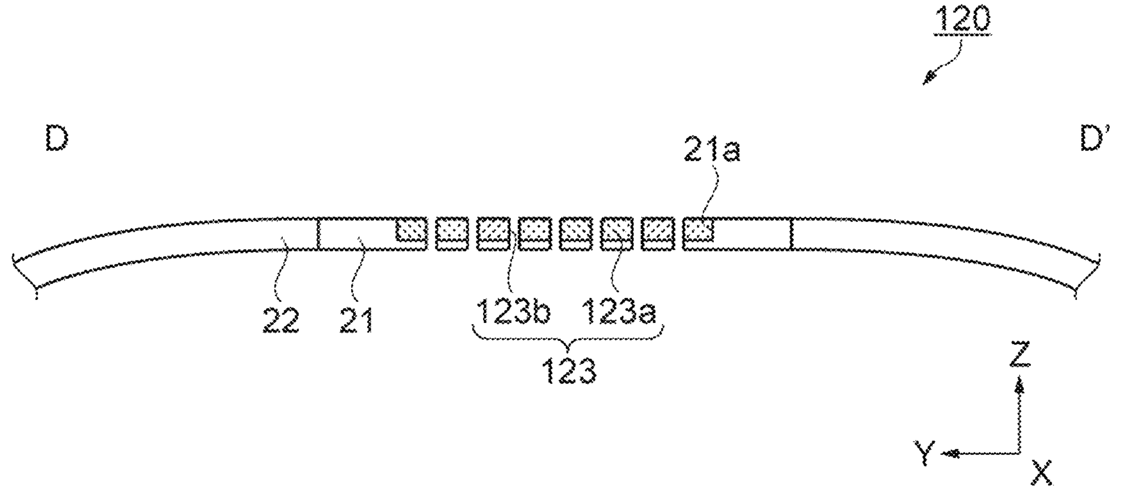
FIG. 13 is a cross-sectional view taken along line D-D' of the strap illustrated in FIG. 12.

As illustrated in FIG. 11, the recessed portion 21*a* is provided in the central portion of the base 21 of the strap 120. As illustrated in FIG. 9, the recessed portion 21*a* is provided with the decoration 123 having the mesh shape in plan view. As illustrated in FIGS. 10, 12, and 13, the decoration 123 includes a light emitting body 123*a* disposed in the recessed portion 21*a* and a plurality of through holes 123*b* as openings having a pattern shape formed by a plurality of openings. The light emitting body 123*a* has the same configuration as that of the light emitting body of the first embodiment described above.

In this way, by forming the decoration 123 of the base 21 in the mesh shape, a variety of designs corresponding to the preference of the user can be obtained. Furthermore, the internal structure of the watch body 10 can be confirmed with a silhouette from the rear surface of the base 21, and the decorativeness can be enhanced.

As described above, in the wrist watch 101 of the second embodiment, the decoration 23 may include the plurality of openings. According to this configuration, since the plurality of through holes 123*b* are included as the openings having the pattern shape formed by the plurality of openings, the pattern can be visually recognized through the gaps of the movement 12 from the cover member 15 side, and the pattern can be visually recognized and the movement 12 can be visually recognized through the plurality of through holes 123*b* from the base 21 side. Accordingly, the decorativeness of the wrist watch 101 can be enhanced.

A modification of the embodiment described above will be described below.

Figure 14:
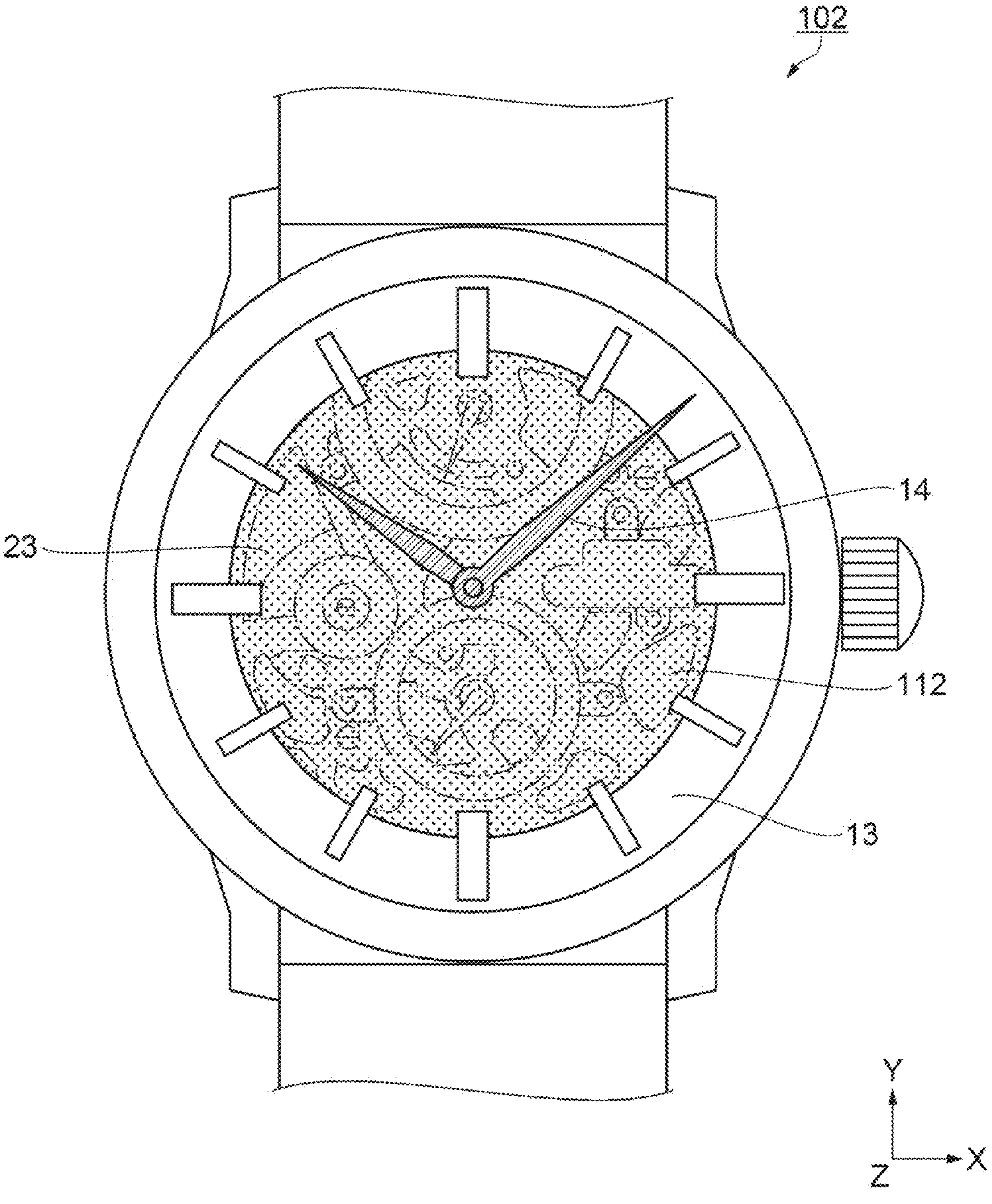
FIG. 14 is a plan view illustrating a configuration of a wrist watch according to a modification.

As described above, not limited to viewing the decoration 23 from the visual recognition regions 18 of the watch body 10, the base 21 may be mounted to the watch body 10 as illustrated in FIG. 14. FIG. 14 is a plan view illustrating a configuration of a wrist watch 102 according to the modification.

As illustrated in FIG. 14, in the wrist watch 102 of the modification, a movement 112 is formed of a transparent member, and for example, the decoration 23 of the base 21 can be seen though the entire region excluding the dial 13. The hand 14 may be not the transparent member as a function of confirming the time. However, the hand 14 may be formed of the transparent member. The dial 13 may also be formed of the transparent member. According to this, the visual recognition regions 18 of the decoration 23 of the base 21 can be increased, and the decorativeness can be further improved.

Furthermore, the decorations 23 and 123 include the light emitting body, but not limited to be the light emitting body, and may be formed of a metal foil, a shell, lame, a hologram, a lacquer, or the like. Note that a protective film may be formed on the surface of the decorations 23 and 123 of the above-described embodiment in order to prevent deterioration of the surface.

Furthermore, not limited to be the mesh shape as in the decoration 123 according to the second embodiment, a radial shape, a lattice shape, a stripe shape, a geometric shape, or the like may be used as the openings having the pattern shape. Alternatively, the openings may be displayed as stippling by openings having a dot shape. The decoration 123 of the second embodiment includes the light emitting body, but the base itself functions as the decoration by including the openings having the pattern shape, and thus the light emitting body or the like need not be included.

Figure 15:
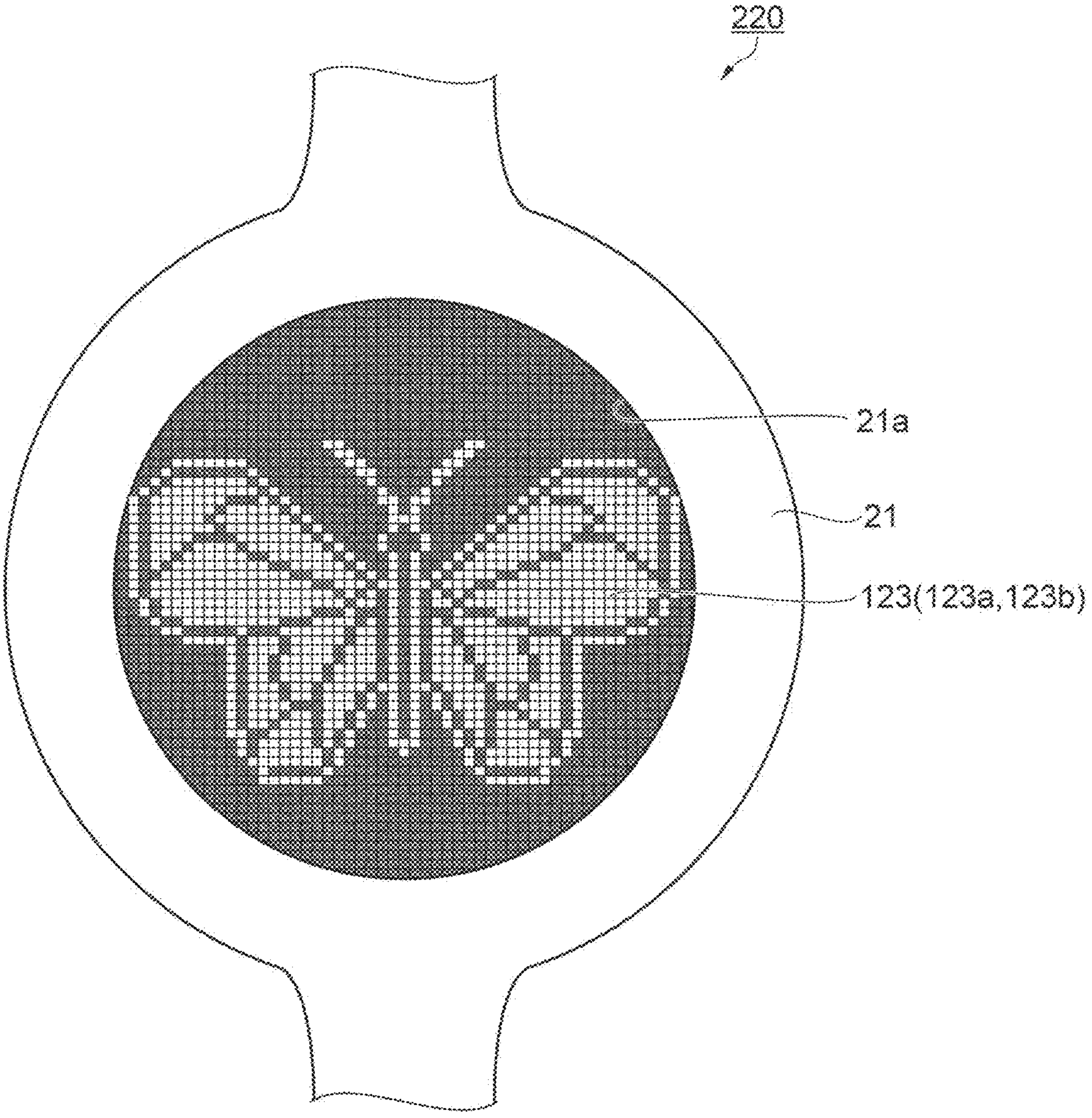
FIG. 15 is a plan view illustrating a configuration of a strap according to a modification.

In addition, regarding the display of the stippling by the openings having the dot shape, as in a strap 220 illustrated in FIG. 15, for example, a figure of insects such as a butterfly may be drawn in the recessed portion 21*a* of the base 21. The decoration 123 in this case may include the light emitting body, or even when the light emitting body is not included, the decorativeness can be enhanced.

Not limited to the case in which the recessed portion 21*a* is formed in the central portion of the base 21, and, for example, on the mounting side of the wrist watch 100 in the base 21, there may be a portion in which an opening region reaching from the central portion to the outer periphery of the base 21. According to this, it is possible to easily remove sweat when the wrist watch 100 is worn. Note that since rigidity and durability is higher when the material of the base 21 is formed of the metal material than the resin material, the material of the base 21 may be the metal material. The base 21 is not limited to a shape in which the thickness of the central portion is thinner than the thickness of the outer periphery, and, for example, a structure may be used in which a flat plate is bent and a recessed portion is provided with respect to the outer periphery.

What is claimed is:

1. A wrist watch comprising:
a watch body including:
a case body having a cylindrical shape;
a movement disposed inside the case body;
a front cover member covering a front opening of the case body and including a first transmissive region through which light passes; and
a case back covering a rear opening of the case body and including a second transmissive region through which the light passes, the second transmissive region overlapping with the first transmissive region in a plan view; and
a strap attached to the watch body, the strap being configured with:
a base facing an external surface of the case back of the watch body; and
a strap body coupled to the base, wherein
the base includes a decoration at a position overlapping the second transmissive region of the case back, and the decoration is configured to be visually recognized through the first transmissive region of the front cover member,
the base includes a first region and a second region,
the first region includes a surface that is in contact with the case back,
the second region is a recessed region having a recess opening and a recess bottom, and the recess opening is located closer to the case back than the recess bottom, and
the decoration is provided in the recessed region.

2. The wrist watch according to claim 1, wherein
the decoration contains a luminous material, and the luminous material is configured to:
glow in a dark; and/or
accumulate light.

3. The wrist watch according to claim 1, wherein
the decoration includes a light emitting unit.

4. The wrist watch according to claim 3, wherein
the light emitting unit contains a luminous material, and the luminous material is configured to:
glow in a dark; and/or
accumulate light.

5. The wrist watch according to claim 1, wherein
the decoration includes another opening.

6. The wrist watch according to claim 5, wherein
the decoration contains a luminous material, and the luminous material is configured to:
glow in a dark; and/or
accumulate light.

7. A strap comprising:
a base facing an external surface of a case back of a watch body, wherein the watch body has:
a front cover member covering a front opening of a case body and including a first transmissive region through which light passes; and
a case back covering a rear opening of the case body and including a second transmissive region through which the light passes, the second transmissive region overlapping with the first transmissive region in a plan view; and
a strap body coupled to the base, wherein
the base includes a decoration at a position overlapping the second transmissive region of the case back, and the decoration is configured to be visually recognized through the first transmissive region of the front cover member,
the base includes a first region and a second region,
the first region includes a surface that is in contact with the case back,
the second region is a recessed region having a recess opening and a recess bottom, and the recess opening is located closer to the case back than the recess bottom, and
the decoration is provided in the recessed region.

8. The strap according to claim 5, wherein
the decoration contains a luminous material, and the luminous material is configured to:
glow in a dark; and/or
accumulate light.

* * * * *